(12) United States Patent
Bullock et al.

(10) Patent No.: US 11,219,975 B2
(45) Date of Patent: Jan. 11, 2022

(54) DEVICE FOR INSERTING COIL INSERTS

(71) Applicant: ROLLS-ROYCE plc, London (GB)

(72) Inventors: Martin C. Bullock, Rochdale (GB);
Paolo Villella, Leamington (GB);
George S. Walsh, Coventry (GB);
Stefan A. Winkvist, Coventry (GB)

(73) Assignee: Rolls-Royce PLC, London (GB)

( * ) Notice: Subject to any disclaimer, the term of this patent is extended or adjusted under 35 U.S.C. 154(b) by 460 days.

(21) Appl. No.: 16/247,720

(22) Filed: Jan. 15, 2019

(65) Prior Publication Data
US 2019/0240791 A1    Aug. 8, 2019

(30) Foreign Application Priority Data

Feb. 7, 2018  (GB) ...................................... 1801942

(51) Int. Cl.
| | |
|---|---|
| *B23P 19/06* | (2006.01) |
| *B23P 19/12* | (2006.01) |
| *B23P 19/10* | (2006.01) |

(52) U.S. Cl.
CPC ............... *B23P 19/12* (2013.01); *B23P 19/06* (2013.01); *B23P 19/105* (2013.01)

(58) Field of Classification Search
CPC ......... B23P 19/06; B23P 19/12; B23P 19/105; B25B 27/143
See application file for complete search history.

(56) References Cited

U.S. PATENT DOCUMENTS

| | | | |
|---|---|---|---|
| 4,155,169 A | 5/1979 | Drake et al. | |
| 5,123,311 A * | 6/1992 | Dymek | B25B 13/481 403/229 |
| 7,055,408 B2 * | 6/2006 | Sasaki | B23P 19/06 81/433 |
| 2001/0018804 A1 | 9/2001 | Won et al. | |
| 2016/0326896 A1 * | 11/2016 | Jamison | F01D 9/042 |

FOREIGN PATENT DOCUMENTS

| | | |
|---|---|---|
| DE | 215961 | 11/1984 |
| JP | H1133834 | 2/1999 |
| KR | 20090011546 | 2/2009 |
| SU | 1229004 | 5/1986 |
| WO | 2016201477 | 12/2016 |

OTHER PUBLICATIONS

Great Britain search report dated Jul. 26, 2018, issued in GB Patent Application No. 1801942.2.

* cited by examiner

*Primary Examiner* — Mahdi H Nejad
(74) *Attorney, Agent, or Firm* — Shumaker & Sieffert, P.A.

(57) ABSTRACT

A device is provided for inserting coil inserts into threaded holes. The device includes an insertion tool having a manipulator end which is configured to receive and hold a coil insert, and which is operable to apply a torque to the coil insert to screw the coil insert into a threaded hole when presented thereto, the manipulator end having an insertion axis which is coincident with the axis of the coil insert when held by the manipulator end. The device further includes a tool support to which the insertion tool is mounted, the tool support being fixable to an end of a robot arm whereby the manipulator end is presentable by the robot arm to the threaded hole for insertion therein of the coil insert.

12 Claims, 5 Drawing Sheets

DEVICE FOR INSERTING COIL INSERTS

CROSS-REFERENCE TO RELATED APPLICATIONS

This application is based upon and claims the benefit of priority from UK Patent Application No. GB1801942.2, filed on 7 Feb. 2018, the entire contents of which are hereby incorporated by reference.

BACKGROUND

Technical Field

The present disclosure relates to a device for inserting coil inserts into threaded holes.

Description of the Related Art

Coil inserts, also known as Helicoils™, are spring-like thread inserts that are threaded into tapped holes, providing a hardwearing screw thread which generally results in a greater torsional strength than the original tapped hole.

Standard coil inserts, e.g. as used in the automotive industry, are made of stainless steel. They have a diameter in the free state larger than that of the hole they are intended for use in, and as a consequence on installation they are pre-wound and expand to fit precisely into the threaded hole.

More specialised coil inserts used in the aerospace industry, however, can be formed of superalloy (e.g. Ni-based superalloy such as Nimonic® alloy available from the Special Metals Corporation). These are harder, more rigid and less springy than stainless steel coil inserts. Superalloy coil inserts are thus inserted simply by being screwed into the threaded hole. The insert typically has a tang at one end of the coil which is engaged by a driver to screw the insert in, after insertion the tang being cut off. There are numerous powered tools available for inserting such coil inserts.

A problem arises, however, that due to its rigidity and lack of compliance, a superalloy coil insert has only a limited ability to "wind up" and thereby reduce in diameter as it goes into the threaded hole. This creates friction and increases the likelihood that the insert will break during the insertion process, especially adjacent to the tang where stresses in the insert are at their highest.

A human tool operator is able to respond to changes in friction during the insertion process to avoid such breakages. A robot tool operator, on the other hand, has less ability to respond, which can lead to too many coil insert breakages when the insertion process is automated. However, a large civil gas turbine engine typically has thousands of holes requiring inserts, and thus there is strong incentive to successfully automate the insertion process as this can lead to significant reductions in manufacturing costs.

SUMMARY

In a first aspect, the present disclosure provides a device for inserting coil inserts into threaded holes, the device including:

an insertion tool having a manipulator end which is configured to receive and hold a coil insert, and which is operable to apply a torque to the coil insert to screw the coil insert into a threaded hole when presented thereto, the manipulator end having an insertion axis which is coincident with the axis of the coil insert when held by the manipulator end; and a tool support to which the insertion tool is mounted, the tool support being fixable to an end of a robot arm whereby the manipulator end is presentable by the robot arm to the threaded hole for insertion therein of the coil insert;

wherein the mounting of the insertion tool to the tool support is mediated by one or more spring members which extend between the tool support and the insertion tool, the one or more spring members allowing the insertion tool to twist about the insertion axis relative to the tool support in reaction to the applied torque, and biasing the insertion tool to an untwisted, reference orientation relative to the tool support.

Thus the one or more spring members can compensate for a relative lack of compliance of the coil insert under the applied torque. In particular, the compliance which is inherent in a stainless steel insert but lacking in a superalloy insert can be provided instead by the insertion tool. This can allow a robot tool operator to "find" and adjust its position during the insertion process just as a human operator does, with the spring members mimicking the human operator's manual adjustments during the process.

In a second aspect, the present disclosure provides a robot arm having an end to which the device of the first aspect is fixed by its tool support.

In a third aspect, the present disclosure provides a use of the device of the first aspect or the robot arm of the second aspect for screwing a coil insert into a threaded hole.

Optional features of the present disclosure will now be set out. These are applicable singly or in any combination with any aspect of the present disclosure.

The one or more spring members may also allow the insertion tool to displace and/or twist about other axes relative to the tool support under a force applied to the manipulator end, and bias the insertion tool to a reference position relative to the tool support. Thus the one or more spring members can also compensate for a relative lack of compliance of the coil insert under such an applied force.

The insertion tool may include a conventional, off-the-shelf insertion tool for inserting coil inserts into threaded holes. Such a conventional tool can provide the manipulator end and can then be adapted to provide a base for attachment of the spring members. For example, the conventional tool may be adapted by the provision of a base in the form of an encircling clamp which clamps around the conventional tool and provides attachment points for the spring members.

Conveniently, the device may have a circular array of the spring members, the array being centred on the insertion axis. For example, the circular array may surround the insertion tool. The spring members may be equally circumferentially spaced in the circular array. There may be six or more of the spring members.

Conveniently, the spring members can be helical springs, the axes of the helical springs being substantially parallel to the insertion axis. The spring members are typically compression springs.

Typically, the coil insert is formed of a high-temperature superalloy, e.g. a Ni-based superalloy, such as a Nimonic® alloy.

DESCRIPTION OF THE DRAWINGS

Embodiments of the present disclosure will now be described by way of example with reference to the accompanying drawings in which.

DETAILED DESCRIPTION

Figure 1:
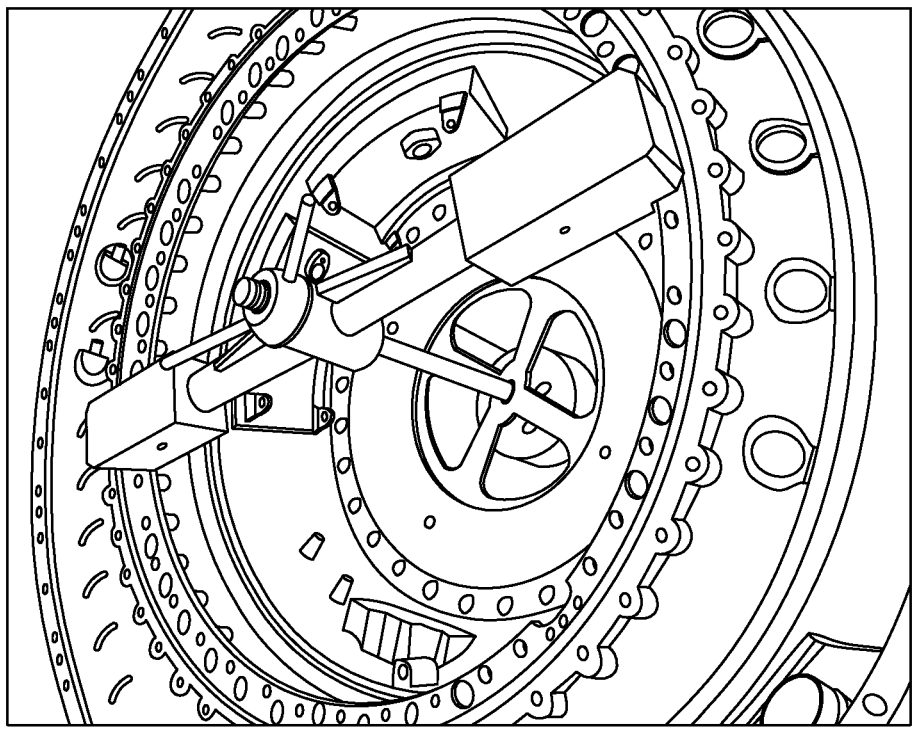
FIG. 1 shows a front bearing housing of a gas turbine engine.

FIG. 1 shows a front bearing housing of a gas turbine engine in a fixture ready to receive superalloy coil inserts into the 48 holes formed in the rim of the housing.

Figure 2:
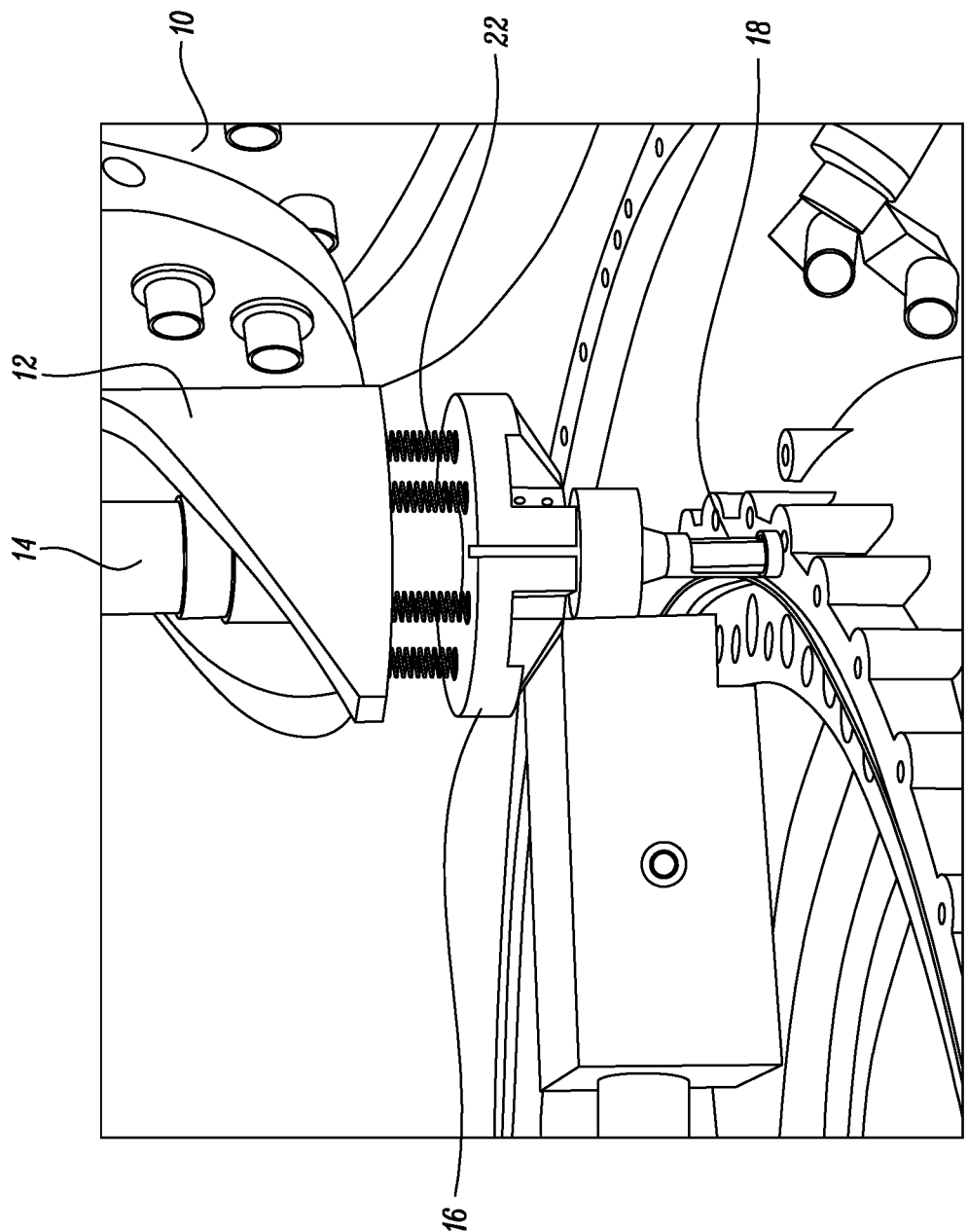
FIG. 2 shows an end of a robot arm to which is attached a tool support to which is mounted a coil insert insertion tool.
Figure 3:
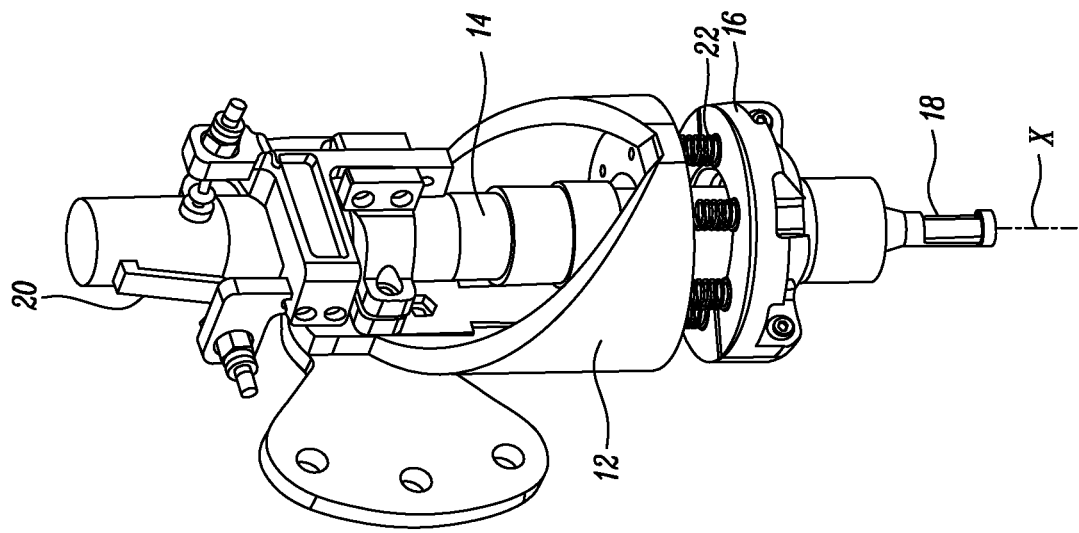
FIG. 3 shows schematically the tool support and the coil insertion tool of FIG. 2.

FIG. 2 shows an end of a robot arm 10 to which is attached a tool support 12. This in turn provides a mount for a coil insert insertion tool. The tool support and coil insertion tool are also shown schematically in FIG. 3.

The tool is formed by a conventional manual insertion tool 14 (e.g. of the kind obtainable from Bollhoff®) and an encircling clamp 16 which clamps around the conventional tool. The conventional tool has a manipulator end 18 which is configured to receive and hold a coil insert, and which is operable to apply a torque to the coil insert to screw the coil insert into a threaded hole when presented thereto. The conventional tool is pneumatically powered and has control buttons 20 at the other end of which, while conventionally manually operated, can be operated in an automated system e.g. by suitable pneumatic circuitry and actuators.

A circular array of (in this case six) compression springs 22 extend from the tool support 12 to the encircling clamp 16. The springs are equally circumferentially spaced around the conventional tool 14 and are axially aligned with the insertion axis X of the manipulator end 18 (i.e. the axis of the coil insert when loaded in the manipulator end). The tool passes through a hole in the tool support, but does not mechanically join with the support other than via the springs. Thus the springs mediate torques and forces transmitted between the insertion tool and the tool support and then to the robot arm 10. In particular, the springs allow the tool to twist about the insertion axis relative to the tool support in reaction to the torque applied to a coil insert at the manipulator end during the insertion process. However, the springs also bias the insertion tool to return to an untwisted, reference orientation relative to the tool support when the torque is released.

In this way the springs 22 can compensate for the relative lack of compliance of a superalloy coil insert under the applied torque. The insertion tool thus experiences less tool kickback when inserting the coil, and reduces the occurrence of cross-threading and jamming. As a result there are fewer coil breakages during insertion.

Figure 4:
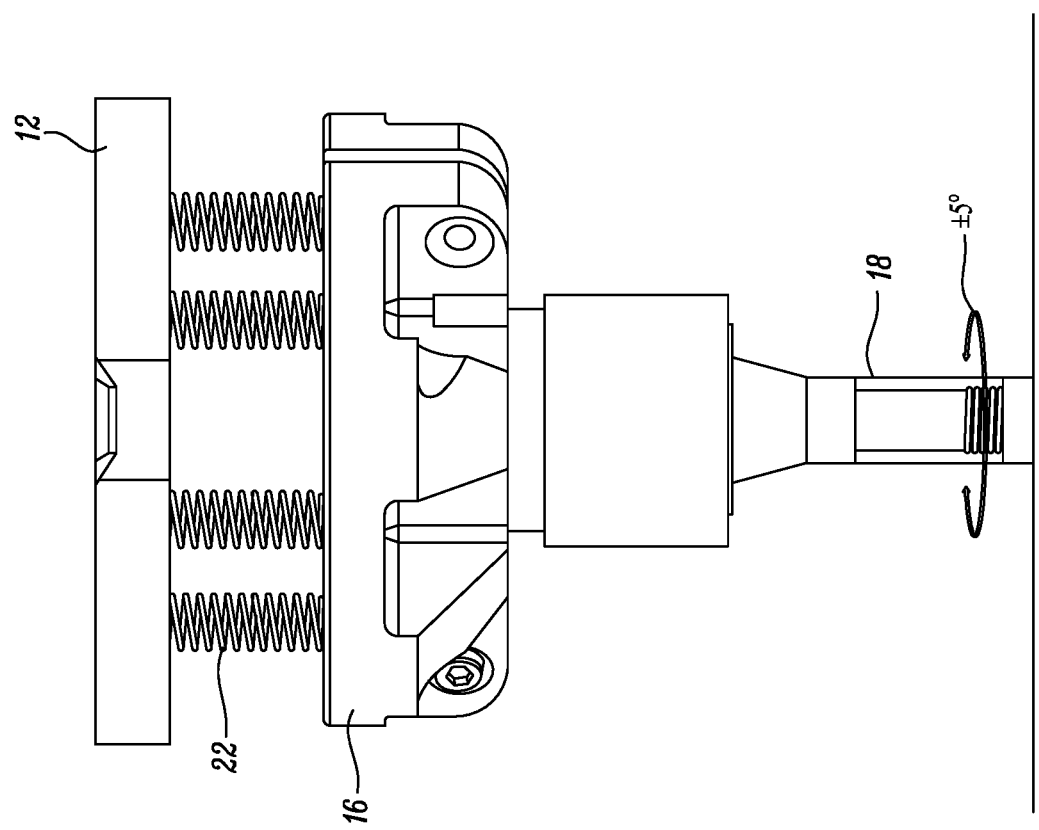
FIG. 4 shows a manipulator end of the coil insertion tool.

The number, stiffness, size, position etc. of the springs 22 can be varied depending on the stiffness and strength of the coil inserts, an aim being to provide enough compliance to reduce coil breakage but not so much compliance that control over and performance of the insertion process is compromised. For example, in order to achieve a suitable compliant behaviour in the six spring, axially-aligned arrangement, the spring constant of the springs can be in the range from 2.5 N/mm to 5 N/mm, and the length of springs can be in the range from 20 mm to 50 mm. In particular, the springs can be 30 mm long and 3.26 N/mm compression springs, having a maximum compression of about 15 mm. In use, the springs can allow a rotation of the tool about the insertion axis of about ±5°, as indicated in FIG. 4.

Figure 5:
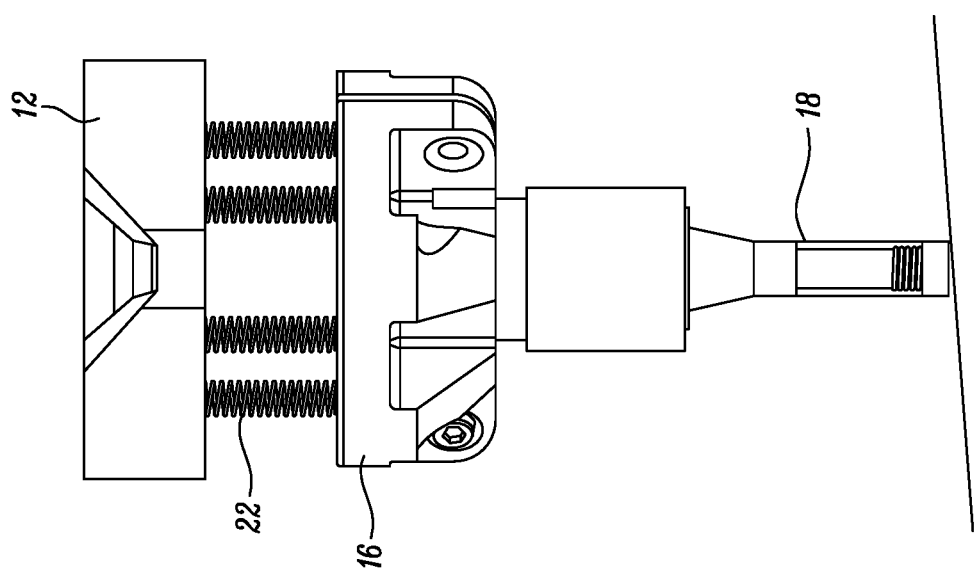
FIG. 5 shows the manipulator end of the coil insertion tool self-aligning when contacting an uneven surface.

The springs 22 also allow the tool, and hence the insertion axis X, to displace and twist about other axes relative to the tool support 12 under a force applied to the manipulator end 18, while biasing the insertion tool to a return reference position in which the tool is centred in the tool. Thus the springs also compensate for a relative lack of compliance of the coil insert under such an applied force. As shown in FIG. 5, this can help the tool to self-align when it contacts an uneven surface. Typically, the springs can allow a deviation of the manipulator end 18 of up to about 8 mm from the centre line of the tool in the return reference position.

Advantageously, the coil insertion process may be part of a wider automated system, including e.g. a vision system, a coil delivery system for loading the insertion tool with coils, a tang removal system for removing the tangs from inserted coils etc. In such a vision system, a camera (e.g. mounted to the robot arm) can provide data for locating the holes and positioning the robot arm relative to the holes. The system may receive measurements from sensors associated with the tool (regarding e.g. torque, depth measurement and insert behaviour) which allows the system to make real-time adjustments to the control of the tool, i.e. on the basis of closed-loop feedback. Different operations (e.g. coil insertion, and tang removal) may require different tools, and the system may therefore also have a tool change station associated with the robot arm.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Moreover, in determining extent of protection, due account shall be taken of any element which is equivalent to an element specified in the claims. Various changes to the described embodiments may be made without departing from the spirit and scope of the invention.

We claim:

1. A device for inserting coil inserts into threaded holes, the device including:

an insertion tool having a manipulator end which is configured to receive and hold a coil insert, and which is operable to apply a torque to the coil insert to screw the coil insert into a threaded hole when presented thereto, the manipulator end having an insertion axis which is coincident with an axis of the coil insert when held by the manipulator end; and a tool support to which the insertion tool is mounted, the tool support being fixable to an end of a robot arm whereby the manipulator end is presentable by the robot arm to the threaded hole for insertion therein of the coil insert;

wherein the mounting of the insertion tool to the tool support is mediated by a circular array of a plurality of compression spring members, wherein each compression spring member of the plurality of compression spring member extends between the tool support and an encircling clamp, which clamps around the insertion tool, the circular array of the plurality of compression spring members allowing the insertion tool to twist about the insertion axis relative to the tool support in reaction to the applied torque, and biasing the insertion tool to an untwisted, reference orientation relative to the tool support.

2. The device according to claim 1, wherein the circular array of the plurality of compression spring members also allow the insertion tool to displace and/or twist about other axes relative to the tool support under a force applied to the manipulator end, and bias the insertion tool to a reference position relative to the tool support.

3. The device according to claim 1, wherein the circular array of the plurality of compression spring members is centered on the insertion axis.

4. The device according to claim 1, wherein the plurality of compression spring members are helical springs, the axes of the helical springs being substantially parallel to the insertion axis.

5. The device according to claim 1, wherein the coil insert is formed of a high-temperature superalloy.

6. A method of utilizing the device of claim 1 for screwing a coil insert into a threaded hole.

7. A system comprising:
- a robot arm having an end; and
- a device for inserting coil inserts into threaded holes, the device including:
  - an insertion tool having a manipulator end which is configured to receive and hold a coil insert, and which is operable to apply a torque to the coil insert to screw the coil insert into a threaded hole when presented thereto, the manipulator end having an insertion axis which is coincident with an axis of the coil insert when held by the manipulator end; and
  - a tool support to which the insertion tool is mounted, the tool support being fixable to an end of a robot arm whereby the manipulator end is presentable by the robot arm to the threaded hole for insertion therein of the coil insert;
  - wherein the mounting of the insertion tool to the tool support is mediated by a circular array of a plurality of compression spring members, wherein each compression spring member of the plurality of compression spring member extends between the tool support and an encircling clamp, which clamps around the insertion tool, the circular array of the plurality of compression spring members allowing the insertion tool to twist about the insertion axis relative to the tool support in reaction to the applied torque, and biasing the insertion tool to an untwisted, reference orientation relative to the tool support, and wherein the device is fixed to the end of the robot arm by the tool support of the device.

8. A method of utilizing the robot arm of claim 7 for screwing a coil insert into a threaded hole.

9. The robot arm according to claim 7, wherein the circular array of the plurality of compression spring members also allow the insertion tool to displace and/or twist about other axes relative to the tool support under a force applied to the manipulator end, and bias the insertion tool to a reference position relative to the tool support.

10. The robot arm according to claim 7, wherein the circular array of the plurality of compression spring members is centered on the insertion axis.

11. The robot arm according to claim 7, wherein the plurality of compression spring members are helical springs, the axes of the helical springs being substantially parallel to the insertion axis.

12. The robot arm according to claim 7, wherein the coil insert is formed of a high-temperature superalloy.

* * * * *